(12) United States Patent
Snyder

(10) Patent No.: US 10,747,830 B2
(45) Date of Patent: Aug. 18, 2020

(54) METHOD AND SYSTEM FOR DISPLAYING ELECTRONIC INFORMATION

(71) Applicant: Mesh Labs Inc., Brooklyn, NY (US)

(72) Inventor: Asher Snyder, Brooklyn, NY (US)

(73) Assignee: MESH LABS INC., Brooklyn, NY (US)

( * ) Notice: Subject to any disclaimer, the term of this patent is extended or adjusted under 35 U.S.C. 154(b) by 405 days.

(21) Appl. No.: 14/826,894

(22) Filed: Aug. 14, 2015

(65) Prior Publication Data

US 2016/0164931 A1 Jun. 9, 2016

Related U.S. Application Data

(60) Provisional application No. 62/083,120, filed on Aug. 14, 2014.

(51) Int. Cl.
| | | |
|---|---|---|
| G06F 16/9535 | (2019.01) | |
| G06T 7/00 | (2017.01) | |
| H04L 29/08 | (2006.01) | |
| H04N 7/18 | (2006.01) | |
| G06T 1/00 | (2006.01) | |

(52) U.S. Cl.
CPC ........ *G06F 16/9535* (2019.01); *G06T 1/0007* (2013.01); *G06T 7/0006* (2013.01); *H04L 67/306* (2013.01); *H04N 7/181* (2013.01); *G06T 2207/10144* (2013.01); *G06T 2207/30148* (2013.01)

(58) Field of Classification Search
CPC ..... H04L 67/306; H04L 63/104; H04L 67/02; H04L 12/1831; G06F 17/30268; G06F 3/04842; G06F 17/30265; G06F 17/3097; G06Q 50/01; G06Q 30/0269; G06Q 30/0631
USPC .................. 707/734, 748; 709/217, 203, 204
See application file for complete search history.

(56) References Cited

U.S. PATENT DOCUMENTS

| | | | | |
|---|---|---|---|---|
| 8,230,036 | B2 * | 7/2012 | Ishikawa | G06Q 10/107 705/14.66 |
| 8,943,044 | B1 * | 1/2015 | Saylor | G06Q 50/01 707/722 |
| 10,223,645 | B2 * | 3/2019 | Sardela Bianchi | G06Q 30/0613 |
| 2004/0210661 | A1 * | 10/2004 | Thompson | G06Q 30/02 709/228 |
| 2005/0195308 | A1 * | 9/2005 | Miyashita | H04N 5/23293 348/333.01 |

(Continued)

*Primary Examiner* — Backhean Tiv

(74) *Attorney, Agent, or Firm* — Kochka Law, LLC; Michael P. Kochka, Esq.

(57) ABSTRACT

The invention discloses a method and system for displaying electronic information for an Online Dating Service. Information is received through a variety of means including electronic analysis of photographs and communications as well as direct questions posed to an individual. Once the information is received a profile describing the interest, personality traits and what traits the individual looks for in a companion is created. To prevent priming based on physical appearance the word cloud is displayed to other individuals prior to a photograph. The photograph can be revealed to the other individuals if they take affirmative action to view the photograph or after an arbitrary period of time such that the other individuals can be primed based on the information in the word cloud without losing the emotional investment in finding a companion.

1 Claim, 4 Drawing Sheets

Amended

(56) References Cited

U.S. PATENT DOCUMENTS

| | | | | |
|---|---|---|---|---|
| 2006/0136498 A1* | 6/2006 | Insley | G06Q 10/00 | |
| 2007/0150340 A1* | 6/2007 | Cartmell | G06Q 10/10 | 705/14.55 |
| 2008/0249863 A1* | 10/2008 | Redmond | G06Q 30/0239 | 705/14.27 |
| 2008/0279419 A1* | 11/2008 | Kluesing | G06K 9/00281 | 382/100 |
| 2010/0185625 A1* | 7/2010 | Johnson | G06Q 30/02 | 707/748 |
| 2010/0250341 A1* | 9/2010 | Hauser | H04L 67/22 | 707/769 |
| 2010/0280904 A1* | 11/2010 | Ahuja | H04L 12/185 | 705/14.58 |
| 2011/0295859 A1* | 12/2011 | Friedman | G06F 16/367 | 707/748 |
| 2012/0239506 A1* | 9/2012 | Saunders | G06Q 30/02 | 705/14.67 |
| 2012/0250951 A1* | 10/2012 | Chen | H04N 1/00156 | 382/118 |
| 2012/0290979 A1* | 11/2012 | Devecka | G06Q 30/0273 | 715/810 |
| 2012/0291056 A1* | 11/2012 | Donoghue | H04N 21/47214 | 725/5 |
| 2013/0007661 A1* | 1/2013 | Klappert | G06F 3/0481 | 715/811 |
| 2013/0110583 A1* | 5/2013 | Ormont | G06Q 30/0251 | 705/7.29 |
| 2013/0173533 A1* | 7/2013 | Nichols | G06F 16/437 | 707/609 |
| 2014/0195950 A1* | 7/2014 | Diament | G06F 16/34 | 715/771 |
| 2014/0282244 A1* | 9/2014 | Speer | G06F 16/444 | 715/811 |
| 2014/0358630 A1* | 12/2014 | Bhagat | G06Q 30/0201 | 705/7.29 |
| 2015/0026192 A1* | 1/2015 | Kamerman | G06F 16/335 | 707/748 |
| 2015/0046793 A1* | 2/2015 | Frenkel | G06F 16/986 | 715/234 |
| 2015/0213001 A1* | 7/2015 | Levy | G06F 40/106 | 715/202 |
| 2015/0281784 A1* | 10/2015 | Laksono | H04N 21/44008 | 725/10 |
| 2016/0004778 A1* | 1/2016 | Finder | H04L 67/306 | 707/722 |
| 2016/0005197 A1* | 1/2016 | Walker | G06F 16/258 | 345/440 |
| 2016/0112364 A1* | 4/2016 | Gelyana | H04L 12/1818 | 709/206 |
| 2016/0127500 A1* | 5/2016 | Rad | G06Q 50/01 | 715/733 |
| 2016/0164931 A1* | 6/2016 | Snyder | G06F 16/9535 | 709/204 |
| 2016/0248864 A1* | 8/2016 | Loia | G06Q 50/01 | |
| 2016/0275372 A1* | 9/2016 | Goodwin | G06N 20/00 | |
| 2017/0076319 A1* | 3/2017 | Ballard | G06F 16/338 | |
| 2017/0270192 A1* | 9/2017 | Breedvelt-Schouten | G06F 16/313 | |
| 2017/0344572 A1* | 11/2017 | Peterson | G06F 16/156 | |

* cited by examiner

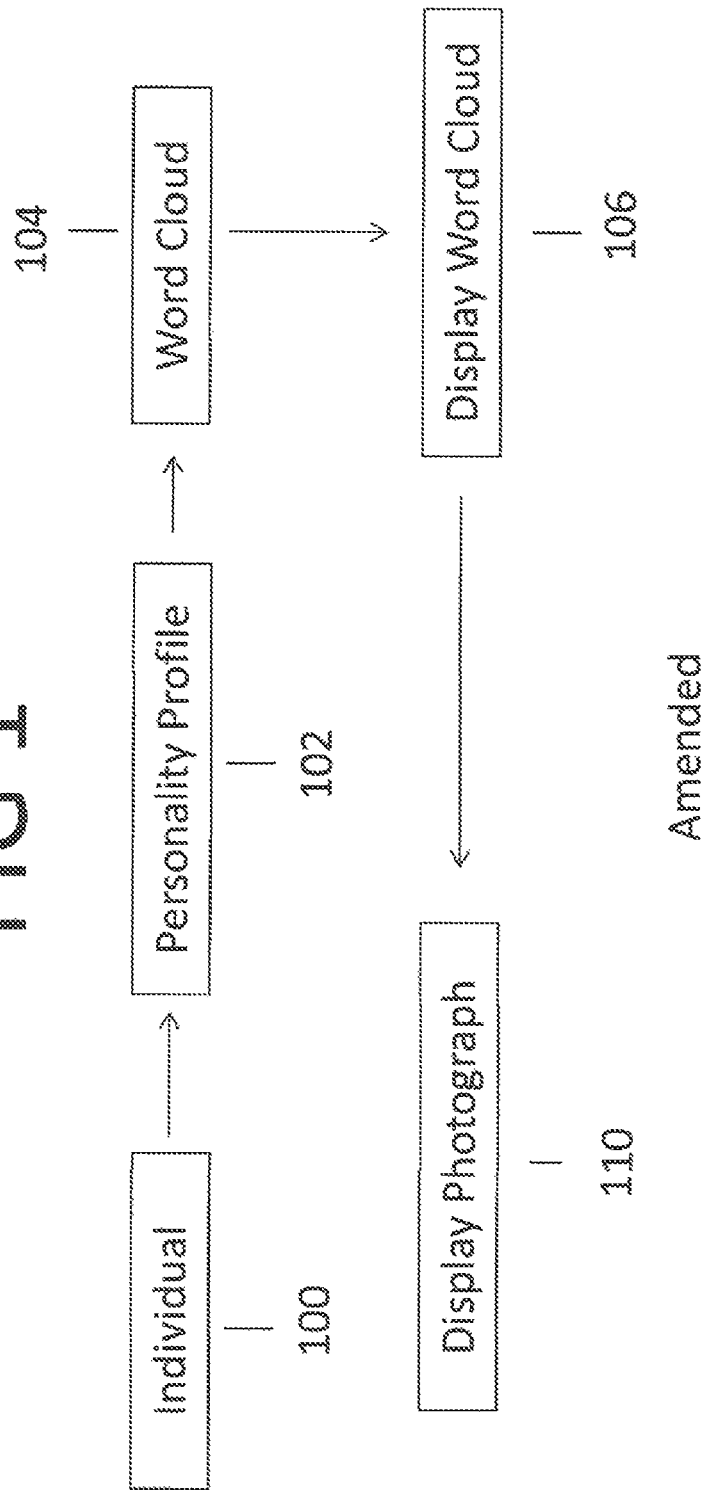

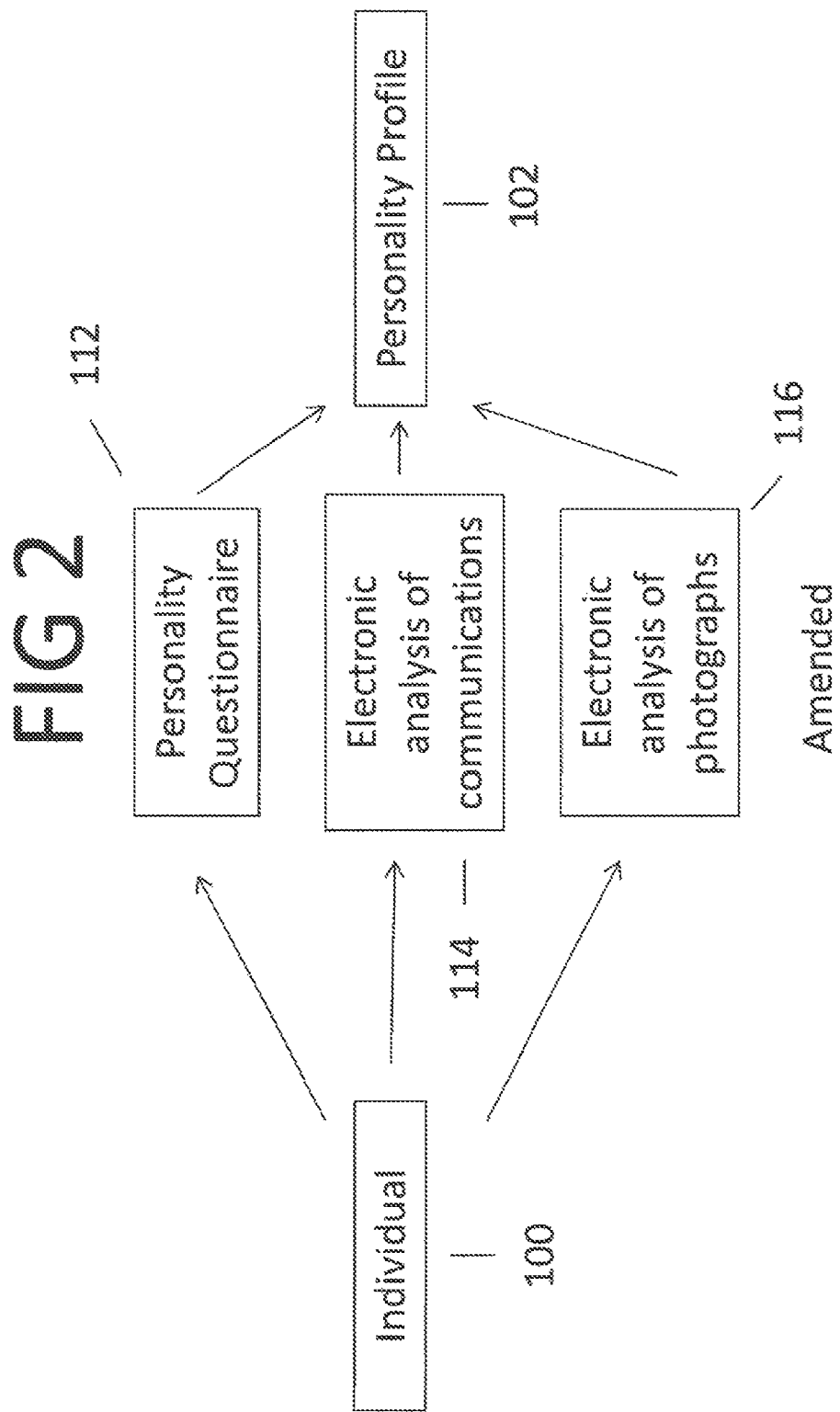

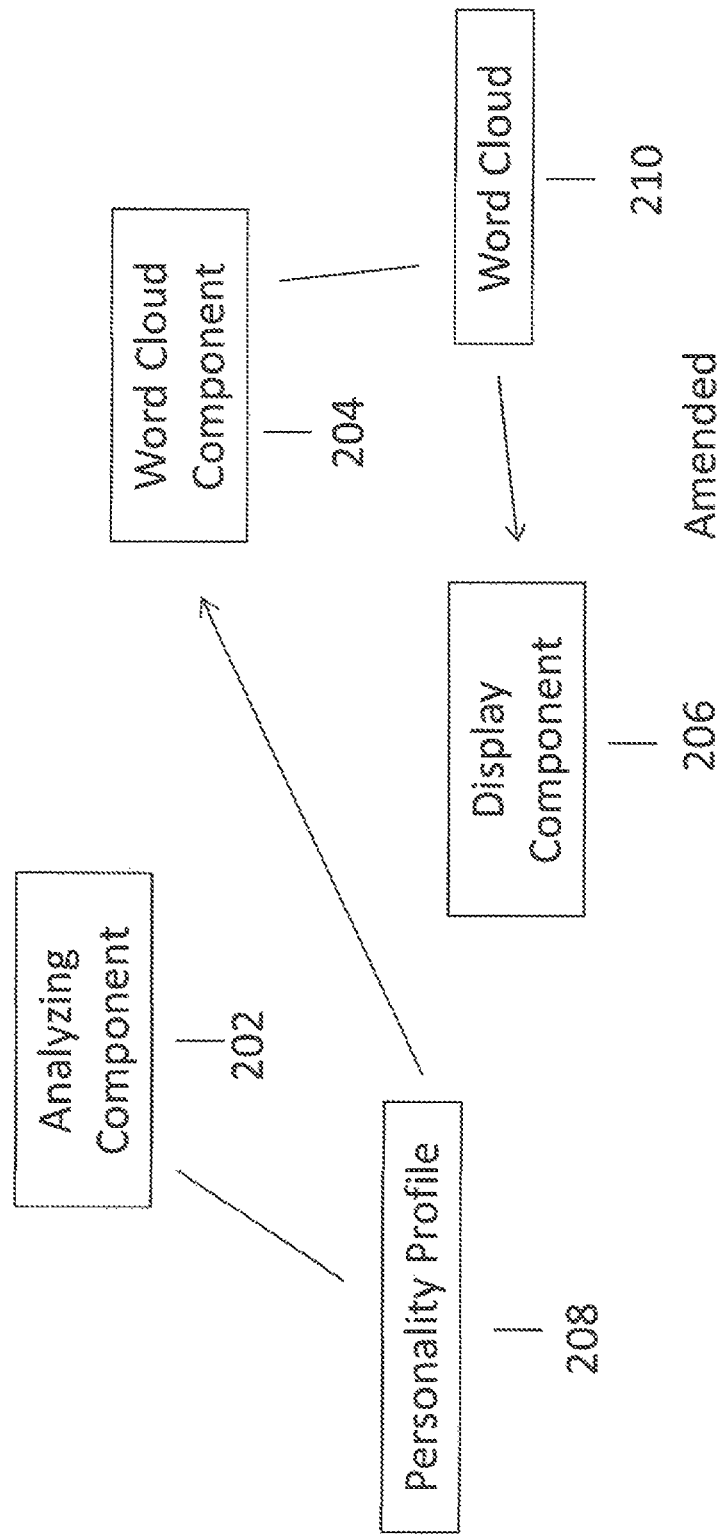

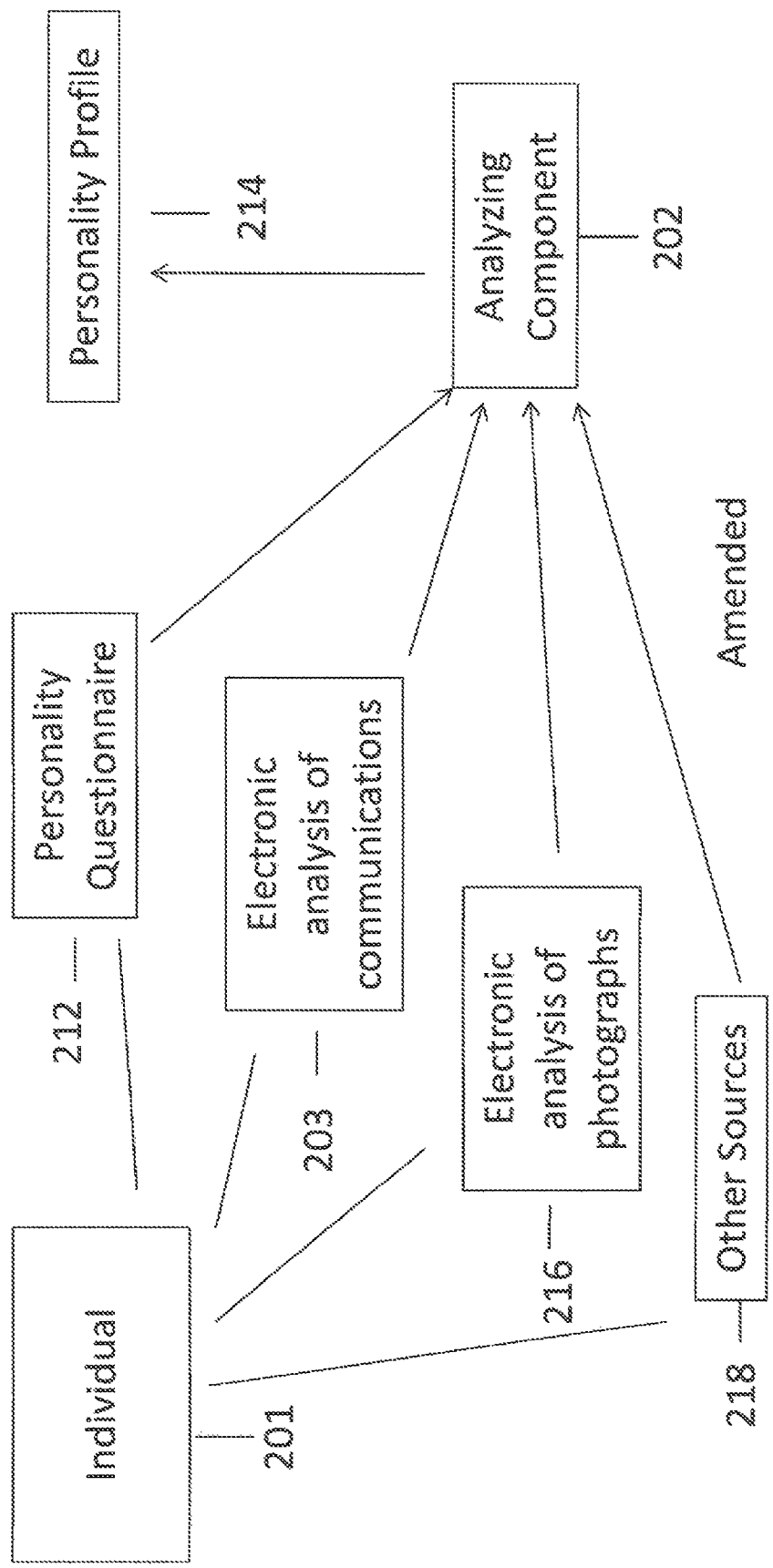

METHOD AND SYSTEM FOR DISPLAYING ELECTRONIC INFORMATION

CROSS-REFERENCE TO RELATED APPLICATIONS

The present application claims priority to U.S. Provisional Patent Application No. 62/038,120 titled Method for Searching People in Online Dating Applications filed on Aug. 15, 2014, the entire disclosure of which is hereby incorporated herein by reference.

BACKGROUND OF THE INVENTION

The present invention relates to information processing methods and systems. More specifically the invention is related to the field of analyzing and displaying electronic information.

Every day more and more people are turning to social media to find a connection with others based on mutual interest and attraction. When they are looking to meet a life partner or companion often times they will turn to Online Dating Services (ODS). Research has shown that an individual's opinion of another person can be colored by their first interaction on a subconscious level. When a person perceives another to be physically attractive they will be more likely to find their under lying personality more appealing. However, this "priming" affect can wear off quickly and once it does the relationship must be sustained by an underlying commonality of interests. A typical member of an ODS usually follows a similar path. Their first interaction with another member is to view their picture. If they are attracted they are primed to view their profile more favorably and attempt to make direct contact. After direct communication is established the priming affect wears off and it is discovered that the two members have nothing in common, or find nothing appealing about each other and the communication ends. This leads to dissatisfaction with the ODS and leaving the community.

Fortunately priming is a two way street. If the individual is able to get a feel for the other person's personality prior to viewing the picture; they are more disposed to find the person attractive if they like the underlying personality traits. The benefits of this form of priming include the fact that as the physical attraction fades the underlying personalities mesh and can sustain a long term relationship leading to increased satisfaction for the ODS's members.

There are two main strategies for dealing with this priming issue. The first strategy is to remove pictures from the profile. This is ineffective as research shows that while seeing a member's picture can distort it is necessary to create an investment in the initial online stages of the relationship. Since in the online dating context a picture is necessary some ODS have tried requiring the profile be approved of by the individual before a picture is sent. This is ineffective in building the necessary emotional investment by the individual and unnecessary. It has been shown that priming happens very quickly and not much information is needed to prime the individual. It would be advantageous that a method and system be developed wherein basic profile information is presented to the individual regarding others for a brief time prior to them viewing the picture.

The other main strategy is to have the members answer questions and suggest other members to the user based on their answer. This suffers from several drawbacks. First it relies on the members to answer the questions accurately. This is problematic because members may attempt to distort their answers to appear more attractive. Second even if they are not being purposefully dishonest they may not be able to make accurate assessments. For example a person may answer that it is important that a potential partner is into sports when in fact they place little value on it. A method and system that takes into account the expressed desires of the individual as well as analyzing their behavior patterns and implicit desires would increase the accuracy of the information provided and greatly increase the likelihood of meshing personalities.

BRIEF SUMMARY OF THE INVENTION

In a preferred embodiment the present invention discloses a method for displaying electronic information comprising the steps of: analyzing an individual's personality; creating a word cloud based on the analysis, displaying the word cloud to at least one other individual; and revealing the photograph of the individual to the at least one other individual. The step of analyzing comprises obtaining information from the individual from one or more of the following sources: the individual's answers to a personality question, computer analysis of the individual's behaviors, computer analysis of photographs posted by the individual, computer analysis of electronic communications sent by the individual, and computer analysis of the response pattern to communications received by the individual.

In another preferred embodiment the present invention discloses a system for displaying electronic information comprising an analyzing component, a word cloud component and a display component. The analyzing component receives information from various sources including but not limited to information imputed by a user, electronic messages sent by the user, photographs uploaded by the user and behavior's displayed by the user to create a detailed personality profile. The word cloud component receives the information from the analyzing component and creates a word cloud wherein a word cloud is easily understood way of displaying a substantial amount of data in short time. The display component receives the word cloud and displays the word cloud to at least one other user. The display component further reveals the picture of the user after the word cloud has been displayed.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

FIG. 1 is a schematic view of the method for displaying electronic information;

FIG. 2 is a schematic view of how information is received from an individual for analysis;

FIG. 3 is a schematic view of a system for displaying electronic information; and FIG. 4 is a schematic view of how the analyzing component receives information electronically.

DETAILED DESCRIPTION OF THE INVENTION

Certain terminology is used in the following description for convenience only and is not limiting. Unless specifically set forth herein, the terms "a", "an", and "the" are not limited to one element but instead should be read as meaning "at least one". The terminology includes the words above specifically mentioned, derivatives thereof, and words of similar import. As used herein the term "personality", "personality trait" or "personality profile" or any like term includes personality traits such as introvert and extrovert, and interests such as knitting, sports and music. This list is for explanatory purposes only and does not limit the scope of the invention.

In a preferred embodiment of the present invention discloses a method for displaying electronic information. As shown in FIG. 1 information is obtained from an individual 100 and a personality profile 102 is created describing the individual's 100 interests and underlying personality. Based upon the personality profile 102 a word cloud 104 is created. The word cloud 104 is displayed 106 to at least one other individual. After the word cloud is displayed a photograph 110 of the individual is displayed to the at least one other individual 108.

As shown in FIG. 2 the information is obtained from the individual 100 from a variety of sources. For purposes of explanation only the collection of information an analysis upon that information will be described with respect to one potential personality trait, specifically sports. A person skilled in the art will understand that this description can be extended to other potential personality traits without deviating from the invention. Information may be obtained from the individual's 100 answers to a personality questionnaire 112. For example the individual 100 may be asked if they like sports; how much they like sports; what individual sport they like/dislike; is it important that a potential companion like sports; and other similar questions. Information may also be obtained from a computer analysis of their communications 114. Methods for analyzing electronic communications 114 are well known in the art and any of these methods may be used without doing harm to the disclosed invention. Returning to the sports example an electronic communication 114 can be analyzed to determine if the message makes positive or negative reference to sports. Information may also be obtained from computer analysis of photographs 116 posted by the individual. Methods for electronic photographic analysis are well known in the art and any of these methods may be used without harm to the disclosed invention. Once again returning to sports it can be determined if there are sports related items in the photograph such as: a team shirt; team banners; or anything else that may show either an increased or decreased interest in sports.

As shown in FIG. 1 A word cloud 104 is a method of displaying ideas in a easily understood way that indicates importance and intensity through use of color size and position of words in the word cloud 104. For example when a personality trait is more important to the individual the text will appear larger and more centralized in the word cloud 104 then if it was less important. It may also be a different color than other words to further distinguish it from the other thoughts expressed in the cloud 104. Methods of creating word clouds are well known in the art and any of these methods may be used without affecting the disclosed invention.

Once the word cloud 104 has been created it will be displayed to at least one other individual. The word cloud 104 will be displayed prior to a photo of the individual 100 being revealed to the other individual. The photo of the individual 100 may be displayed if the word cloud 104 is selected by the one other individual. It may be displayed automatically after a period of time. The time period may be 1 second or 2 seconds or any other suitable length of time to allow the one other individual to absorb the ideas expressed in the word cloud 104 but not so long as to have the one other individual lose their emotional investment in the process.

In a second preferred embodiment the present invention discloses a system for displaying electronic information 200 as shown in FIG. 3 which includes an analyzing component 202, a word cloud component 204 and a display component 206. The analyzing component 202 receives information from an individual regarding the individual's personality. The analyzing component 202 takes the information and creates a personality profile 208, wherein the personality profile describes the individual's likes/dislikes for example, the individual may like baseball, skiing and reading novels, and dislike football and watching television; and personality traits, for example the individual may be a confident introvert. The personality profile 208 is received by the word cloud component 204 which takes the information in the personality profile 208 and converts it into a word cloud 210. The display component 206 takes the word cloud 210 and displays it to at least one other individual. The display component 206 further displays a picture of the individual to the at least one other individual strictly after the word cloud 210 has been displayed.

As shown in FIG. 4 the analyzing component 202 receives information electronically from an individual 201 in a variety of ways. Information can be received from answers to a personality questionnaire 212. Questions may include but are not limited to questions such as: are you interested in sewing; do you like being the center of attention; are you generally content; and the like such that an accurate personality profile 214 can be created. Information can be received electronically from the individual for electronic analysis of communications 203 sent or received by the individual. For example the individual may write that "he likes people that knit" even if the individual does not have knitting in the answers to the personality questionnaire 212. This may indicate that the individual finds knitting an attractive feature in a companion even if they have no personal interest in it at all.

Information can be received electronically from the individual from electronic photographic analysis 216 of photographs posted by the individual. Finally information can be received electronically from any other source 218 that is not specifically mentioned but provides relevant information regarding the individual's personality.

As shown in FIG. 3 the word cloud component 204 receives the personality profile form the analyzing component and creates a word cloud 210. The word cloud 210 is similar to the word cloud as described above. The word cloud 210 is easily and quickly understood because it uses size, color and position of words describing the individual's likes, dislikes and traits to emphasize what is and is not important to the individual. For example if the individual if being shy is a strong component of the individual's personality, the word shy may appear bigger and more centralized in the word cloud 210 than other descriptive words.

The display component 206 receives the word cloud 210 from the word cloud component 204 and displays it to at least one other individual. The display component then displays a photograph of the individual to the one other individual. The photograph is displayed strictly after the word cloud 210 has been displayed. The at least one other individual can choose to see the photograph of the individual or it can be displayed automatically. The display component 206 can display the photograph of the individual automattical after an arbitrary time such that the at least one other individual can absorb the information in the word cloud 210. The arbitrary period of time can be one second. The arbitrary period of time can be any time less than five seconds.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A method for connecting individuals in an online dating service, the method comprising:
   - receiving, by a computer, at least one electronic photograph from a first individual;
   - analyzing, by the computer, the at least one electronic photograph and generating electronic photographic analysis;
   - receiving information from the first individual from answers to a personality questionnaire;
   - analyzing, by the computer, communications sent by the first individual to determine electronic communication analysis data;
   - creating, by the computer, a personality profile for the first individual from electronic information, the electronic information comprising the electronic photographic analysis, information received from the first individual from answers to the personality questionnaire, and the electronic communication analysis data;
   - using, by the computer, the personality profile to create a word cloud, wherein the word cloud describes the first individual's likes or dislikes and traits determined by the computer from the electronic photographic analysis, information received from the first individual answers to the personality questionnaire, and the electronic communication analysis data;
   - displaying, by the computer, the word cloud to at least one other individual when the computer determines that the first individual matches the at least one other individual's desired likes or dislikes and traits as determined by a personality profile generated by the computer for the at least one other individual, wherein the personality profile for the at least one other individual is generated by the computer based on electronic photographic analysis of the at least one other individual, information received from the at least one other individual from answers to a personality questionnaire, and electronic communication analysis data of communications sent by the at least one other individual; and
   - revealing, by the computer, a picture of the first individual to the at least one other individual after displaying, by the computer, the word cloud to the at least one other individual, wherein the computer determines which words in the word cloud to display larger and more centralized than other words based on an analysis by the computer of which likes or dislikes and traits are important the first individual, which is based on at least one of the first individual's answers to the personality questionnaire and the electronic photographic analysis, wherein the at least one other individual chooses to reveal the photograph of the first individual after viewing the word cloud; and
   - wherein the photograph of the first individual is revealed to the at least one other individual after a specified period of time, the specified period of time being less than five seconds.

\* \* \* \* \*